(No Model.)
O. HUFFMAN.
ANIMAL TRAP.
No. 380,439. Patented Apr. 3, 1888.
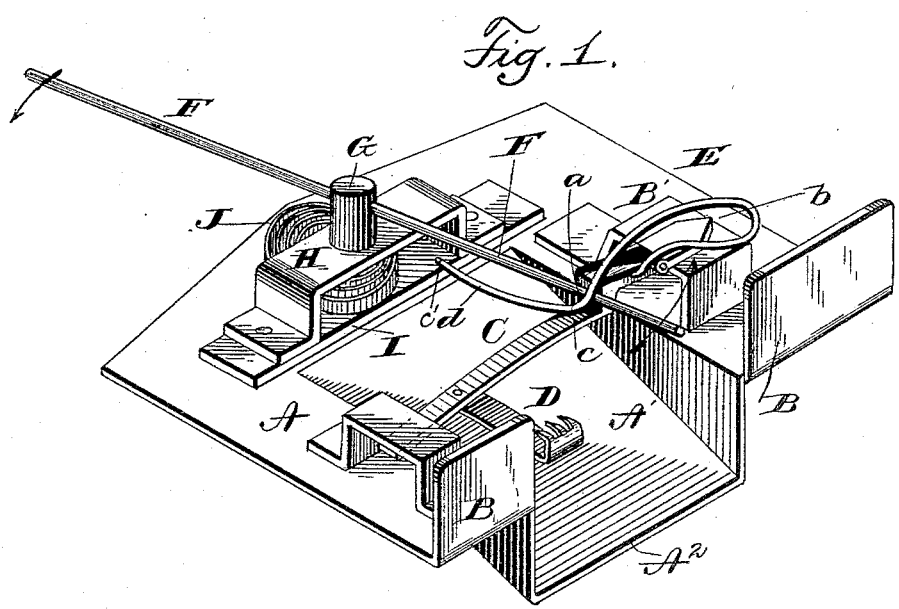
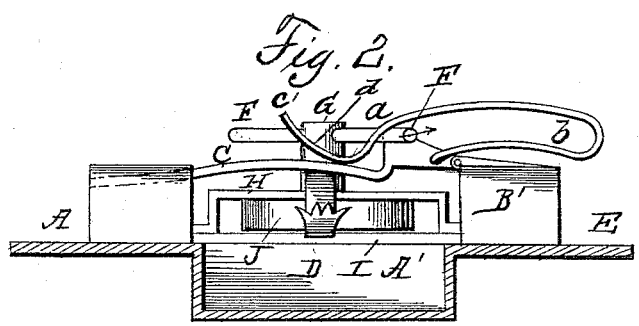
Witnesses
F. L. Ourand
S. G. Nottingham
Inventor
Orlando Huffman
By his Attorney
Leggett & Leggett

UNITED STATES PATENT OFFICE.

ORLANDO HUFFMAN, OF FRIEND, NEBRASKA, ASSIGNOR OF ONE-HALF TO THOMAS ELLIS BROWNE, OF SAME PLACE.

ANIMAL-TRAP.

SPECIFICATION forming part of Letters Patent No. 380,439, dated April 3, 1888.

Application filed August 1, 1887. Serial No. 245,858. (No model.)

*To all whom it may concern:*

Be it known that I, ORLANDO HUFFMAN, of Friend, in the county of Saline and State of Nebraska, have invented certain new and useful Improvements in Traps for the Extermination of Rodents; and I do hereby declare the following to be a full, clear, and exact description of the invention, such as will enable others skilled in the art to which it appertains to make and use the same.

My invention relates to an improvement in traps for the extermination of rodents, and more particularly for the destruction of rats, mice, or gophers.

The object of my invention is to produce an effective and simple device for the purpose that will instantly kill the vermin that are attracted by a bait affixed to its trigger, and that will also automatically set itself for several successive discharges of a spring-actuated hammer-bar that kills the animal by a blow on the head.

To effect the purpose mentioned my invention consists in certain features of construction and combinations of parts, that will be hereinafter described, and pointed out in the claims.

Referring to the drawings making a part of this specification, Figure 1 is a view in perspective of my improved device, and Fig. 2 is a view in front elevation, partly in section, of same.

A represents the base-plate of the trap, consisting, preferably, of a metallic plate formed with a sloping depression, A', that inclines toward the front edge of the base-plate to produce an approach for the animal between the vertical flanges B B, which are integral with the base-plate A and are intended to afford a means for connecting the plate with any proper box or guard, to prevent access to the bait from any other point than the front edge, A², of the inclined surface A'.

Upon the plate A, upon one side of the incline A', a bracket, B', is secured, and on this bracket bait-bar C is hinged by one end, so as to allow it to project across the incline A' about parallel to the vertical flanges B B a proper distance in the rear of the same.

The bar C has a bait-fork, D, attached to it that projects a short distance from its forward edge, to hold the bait inside the trap-cover, but close to the front edge of the inclined plate A'. A shoulder, $a$, is produced on the spring bait-bar C, for a purpose that will be shown, and a wire latching-guard, E, is secured by one end to the bar C.

The latching-guard E is bent rearwardly and then curved upward and forward to produce a loop at $b$, the upper portion of the latching-guard inclining downwardly at a point, $c$, just above the shoulder $a$ on the bait-bar C, so as to lie near to the top edge of this shoulder. The free end $d$ of the latching-guard E is bent upwardly in a diagonal direction from the point $c$ to its termination $c'$, the bending of the wire in the manner described forming a spring-latch that lies above the bait-bar C in such a position as to cause a resetting of the trap when it is discharged. The upwardly-curved free end of the latching-guard rests in the plane traversed by the hammer-bars, and as the latter are swung around they come in contact with the inclined portion of the latching-guard, and, as a consequence, raise the guard sufficiently to permit the hammer-bar to pass under the guard. This upward movement of the guard carries with it the free end of the bait-bar, and by the time the hammer-bar has passed under the guard the free end of the bent bar has been elevated sufficiently to bring the shoulder $a$ on the bait-bar in a position to engage the hammer-bar and stop it or reset it.

The hammer-bars F F are supported upon a vertical shaft, G, and extend at right angles to the shaft from its center, they being in fact one bar that is fixed at its middle to produce two arms of equal length.

The length of the hammer-bars F, considered in relation to the distance of their supporting-shaft G from the bait-bar C, in the rear of which they are stationed, is such that the rapid revolution of the shaft G will cause the free ends of these bars to move swiftly across the bait-hook on the bait-bar C and strike forcibly on the side of the head a rat or other small animal that nibbles at the bait.

A bent plate, H, is perforated near its center of length and width to give support to the upright shaft G, the lower end of this shaft stepping in a base-plate, I, on which the plate H rests, these two plates H and I together forming a spring-box for the reception and retention in position of the volute coiled spring J, which has its outer end in fixed engagement with the inner surface of the top plate, H, of the spring-box, while its inner end is perforated and hooked over a stud on the shaft G.

The extremities of the hammer-bars F may be weighted to form heads of sufficient size to strike a heavy blow, or the bars may be made of such a diameter as to afford the necessary weight.

The volute spring J must be connected to the plate H and shaft G, so as to give impetus to the bars G in a direction toward the shoulder *a* on bait-bar C, and it is important that the round surface of the cylindrical hammer-bars F should lie in such a position with regard to the upper edge of this shoulder *a* and the bent body of the latching-guard wire E at the point *c* that they will be held between these pieces, so as to be released and make a revolution when the bait is pulled at.

From the foregoing it is evident that the winding up of the volute spring J may be accomplished by revolving the hammer-bars F as levers, and when fully wound up the adjacent end of a hammer-bar will catch between the guard E and shoulder *a* of the bait-bar and hold the latter elevated. This connection must be made so sensitive that a slight pulling action at the bait will draw the bait-bar C downward enough to release the hammer-bar. The other end will be thrown around with such force as to kill the rat or gopher before it can get away, and, if the trap is placed on top of a box with a narrow strip of wood leading up in front of the bait, the rodent will fall away from the trap into the box or barrel, and the bar, catching upon the shoulder *a*, will be reset, which operation may be continued until the volute spring is nearly unwound, when the resetting may be effected as has been shown.

Many slight changes might be adopted in the manufacture of this device that are of analogous form; hence I do not desire to limit myself to the exact shapes herein shown; but, Having fully described my invention, what I claim as new, and desire to secure by Letters Patent, is—

1. The combination, with a base-plate having an inclined center portion sloping toward one side, a hammer-bar, and a spring for rotating the hammer-bar, of a bait-bar leading across said inclined portion of the base and located in a plane below the plane of the hammer-bar and provided with a shoulder to engage said hammer-bar, substantially as set forth.

2. The combination, with a base-plate, a hammer-bar, and a spring for rotating said bar, of a hinged bait-bar located in a plane below the path traversed by the hammer-bar and provided with a shoulder, and a latching-guard secured to the bait-bar and adapted to be engaged by the hammer-bar, substantially as set forth.

3. The combination, with a base-plate sloping toward one side edge, a bracket attached to the base-plate, and a bait-bar, of a latching-guard, an upright shaft, a hammer-bar secured thereto, and a spring to rotate the shaft and hammer-bar, substantially as set forth.

4. The combination, with a base-plate having an integral sloping portion made lowest at one side edge, a bracket, and a bait-bar having a shoulder or catch made on its upper surface, of a latching-guard attached to the bait-bar, an upright shaft, a spring for rotating said shaft, and a hammer-bar affixed at right angles to the shaft, substantially as set forth.

In testimony whereof I have signed this specification in the presence of two subscribing witnesses.

ORLANDO HUFFMAN.

Witnesses:
L. H. PAGE,
W. I. BRUNDAGE.